United States Patent [19]

Kim

[11] Patent Number: 5,512,964
[45] Date of Patent: Apr. 30, 1996

[54] DYNAMIC FOCUSING CIRCUIT HAVING A PSEUDO HORIZONTAL OUTPUT CIRCUIT TO ELIMINATE PHASE DEVIATION IN A FOCUS SIGNAL

[75] Inventor: Kang H. Kim, Seoul, Rep. of Korea

[73] Assignee: Samsung Electronics Co., Ltd., Seoul, Rep. of Korea

[21] Appl. No.: 223,283

[22] Filed: Apr. 5, 1994

[30] Foreign Application Priority Data

Apr. 16, 1993 [KR] Rep. of Korea .................. 93-6388

[51] Int. Cl.⁶ ................................................ H04N 3/26
[52] U.S. Cl. .................................. 348/806; 315/382.1
[58] Field of Search .................................. 348/806, 807, 348/177, 189, 190; 315/370, 371, 382, 382.1; H04N 3/26

[56] References Cited

U.S. PATENT DOCUMENTS 4,555,649  11/1985  Sharma ................................. 315/382
4,683,405  7/1987  Truskalo et al. ................. 315/382 X
4,916,365  4/1990  Arai ................................. 315/382 X

*Primary Examiner*—Victor R. Kostak
*Assistant Examiner*—John W. Miller
*Attorney, Agent, or Firm*—Ladas & Parry

[57] ABSTRACT

A dynamic focusing circuit capable of eliminating the phase deviations between the horizontal deflection current and the horizontal frequency components by use of a pseudo horizontal output circuit which generates a horizontal component signal having low voltage and small current, and greatly enhancing the correctness of the focus, despite disturbances due to the characteristics of the CRT and deflection yoke, by use of a plurality of variable resistors which can control the amplitude of the vertical and horizontal components, the DC level of the focus signal, and the phase deviation between the horizontal deflection current and the horizontal component of the focus signal. This invention is adaptable to all monitors which has have a focus control function.

7 Claims, 3 Drawing Sheets

FIG.3A

FIG.3B — SEVERAL VOLT.

FIG.3C — HUNDREDS VOLT.

FIG.3D — ABOUT 50V

FIG.3E — ABOUT 5V

FIG.3F — E1, E2, E3 — VERTICAL WAVE / MIXED DYNAMIC FOCUSWAVE / HORIZONTAL WAVE — $1/f_v$

FIG.3G

FIG.3H — DUTY VARIATION

FIG.3I — HUNDREDS VOLT.

FIG.3J 5,512,964

DYNAMIC FOCUSING CIRCUIT HAVING A PSEUDO HORIZONTAL OUTPUT CIRCUIT TO ELIMINATE PHASE DEVIATION IN A FOCUS SIGNAL

FIELD OF THE INVENTION

The present invention relates to dynamic focusing circuits, and more particularly to a dynamic focusing circuit for eliminating phase deviations, due to the delay characteristics of a focus coil in a monitor, between horizontal deflection current and horizontal components of a focus signal so as to adjust the focus of the monitor thereby.

DESCRIPTION OF THE PRIOR ART

A monitor, in general, has a horizontal scanning frequency which is higher for with increased resolution. As a result, however, phase deviations, due to the delay characteristics of a focusing coil in the monitor, between horizontal deflection current and horizontal components of a focus signal causes the focus to be misaligned.

FIG. 1 shows a conventional dynamic focusing circuit. In FIG. 1, a vertical sawtooth signal input is applied to a focus amplifying transistor TR1, through an operational amplifier OP1. The vertical sawtooth signal passes through an integral circuit which consists of a resistor R1, capacitors C1 and C2 to an inverting terminal of the operational amplifier OP1, and also is amplified by the resistance ratio of the resistors R1 and R2 to become a parabola wave signal. After the parabola wave signal is amplified by the transistor TR1, it is supplied to a resistor R5 at the collector side of the transistor TR1. Thus, a vertical focus signal across the resistor R5 appears at a node N. The amplification rate can be controlled by the resistance value of a variable resistor VR1 which is connected to a resistor R4.

In a horizontal output circuit 2, a rectangular wave signal supplied from a horizontal signal input circuit(not shown) is amplified by a horizontal output transistor TR2 in which both a resonance capacitor C7 and damping diode D2 are coupled between its base and emitter, and then applied to a flyback transformer FBT and a deflection coil L3. The rectangular wave signal amplified deflects in the horizontal direction by the deflection coil L3. For the precise control of the deflection operation, a variable coil L2 is coupled to the deflection coil L3 in series and thereby can vary the inductance of the deflection coil L3. A series arrangement of a resistor R6 and a capacitor C6, across the variable coil L2 equivalently represents the substantial conductance and resistance of the deflection coil L3. The horizontal wave signal passed through the deflection coil L3 is applied to an S-correction capacitor (also called a linearity correction capacitor) C5, in order to correct deflection deviations which appear in the shape of the character "S" due to the differences of distances, from a beam gun, between positions on the inner face of a screen of the monitor. Then the horizontal wave signal passes through a DC cut-off capacitor C4 and is amplified by a focusing coil L1, and passes through a DC cut-off capacitor C3 to appear as a DC cut-off signal at the node N. The amplification rate by the focusing coil L1 is proportional to the number of turns off the coil L1.

The horizontal focus signal at the node N is mixed with the vertical focus signal of the parabola wave form, resulting in formation of a dynamic focus signal including horizontal and vertical frequency components. The dynamic focus signal is supplied to grid a focus grid G4 of a cathode-ray tube(abbreviated CRr) and DC level of the dynamic focus signal can be controlled by tile variable resistor VR1.

However, the conventional dynamic focusing circuit has disadvantages that phase deviations, due to the delay characteristics of the focusing coil for amplifying the horizontal deflection current of the horizontal deflection circuit and the horizontal frequency components of the focus signal causes the focus to be misaligned. Moreover the focusing operation can be disturbed by the characteristics of the CRT and the deflection yoke.

SUMMARY OF THE INVENTION

It is accordingly an object of the invention to provide a dynamic focusing circuit capable of eliminating the phase deviations between the horizontal deflection current and the horizontal frequency components by use of a pseudo horizontal output circuit which generates a horizontal components signal having low voltage and small current.

It is another object of the invention to provide a dynamic focusing circuit capable of greatly enhancing the correctness of the focus, despite the disturbance due to the characteristics of the CRT and deflection yoke, by use of a plurality of means which can control an amplitude of the vertical and horizontal components, a DC level of the focus signal, and tile phase deviation between the horizontal deflection components and the horizontal component of the focus signal.

To achieve the objects according to aspects of the invention, in a dynamic focusing circuit generating a dynamic focus signal by use of a sawtooth wave signal generated from a vertical output circuit and a rectangular wave signal generated from a horizontal oscillating circuit, the dynamic focusing circuit comprises a vertical parabola wave output circuit for generating a vertical parabola wave signal after integrating and amplifying said sawtooth wave signal and eliminating a DC components from said sawtooth wave signal, a first amplifying circuit for amplifying said vertical parabola wave signal, a vertical modulating and horizontal size adjusting circuit for modulating the amplitude of said vertical parabola wave signal by comparing said vertical parabola wave signal with a predetermined variable reference voltage, a pseudo horizontal output circuit for generating a pseudo horizontal wave signal whose amplitude is determined by a level of said variable reference voltage, wherein a wave signal formed by said rectangular wave signal is mixed with a wave signal supplied to said vertical-modulating and horizontal-size-adjusting circuit and thereby said rectangular wave signal is combined with said vertical parabola wave signal, a second amplifying circuit for amplifying said pseudo horizontal wave signal, a focus signal output circuit for varying a DC voltage level of a dynamic focus signal consisting of a vertical frequency component generated from said first amplifying circuit and a horizontal frequency component generated from said second amplifying circuit, a horizontal phase control circuit for controlling the phase of said rectangular wave signal, and a duty adjusting circuit coupled to said horizontal phase control circuit and for varying the duty of said rectangular wave signal.

The first amplifying circuit comprises a first means for varying the amplitude of said vertical parabola wave signal which is integrated, a first transistor for amplifying said vertical parabola wave signal to be applied to said first means, a bias stabilizing circuit for applying a bias stabilizing signal to a base of said first transistor so that the emitter bias level is identical to the voltage level of said vertical parabola wave signal, and a second transistor for buffering an output voltage at a collector of said first transistor.

The vertical-modulating and horizontal-size-adjusting circuit comprises a first means for adjusting the amplitude of said vertical frequency component of said dynamic focus signal by varying a DC voltage level of said vertical parabola wave signal, a first capacitor for cutting off a DC component of said vertical parabola wave signal supplied from said first means, a second means for determining an amplitude of said horizontal frequency component of said dynamic focus signal according to a predetermined reference voltage which is established by a resistance, and an operational amplifier for comparing a signal passed through said first capacitor with said reference voltage of said second means.

The pseudo horizontal output circuit comprises a pseudo horizontal output transistor for generating said pseudo horizontal wave signal according to said rectangular wave signal, a pseudo flyback transformer for receiving said output signal of said vertical-modulating and horizontal-size-adjusting circuit, and a pseudo deflection coil and resonance capacitor for generating a horizontal wave signal including said vertical frequency component according to receipt of output signals of said pseudo horizontal output transistor and pseudo flyback transformer.

The second amplifying circuit comprises a second capacitor for eliminating a DC component from said pseudo horizontal wave signal, a damping diode for damping negative voltage components of a signal to be applied to said first capacitor, and a first transistor for amplifying a signal applied to said damping diode.

The focus signal output circuit comprises a first capacitor for eliminating a DC component from said dynamic focus signal including signals generated from said first and second amplifying circuit, and a fourth means for varying a DC voltage level of said dynamic focus signal applied to said first capacitor.

The duty adjusting circuit comprises a first capacitor coupled to said horizontal phase control circuit in parallel, and a first means connected to said first capacitor and for adjusting the duty of a signal generated from said horizontal phase control circuit by means of varying a time constant.

BRIEF DESCRIPTION OF THE DRAWINGS

For a better understanding of the invention and to show how the same may be carried into effect, reference will now be made, by way of example, to the accompanying diagrammatic drawings, in which:

FIGS. 3A to 3H show electrical waveforms of positions in the circuit of FIG. 2, FIG. 3I shows an electrical waveform of horizontal deflection flyback voltage, and FIG. 3J shows an electrical waveform of a horizontal proportion included into a dynamic focus signal.

DETAILED DESCRIPTION OF A PREFERRED EMBODIMENT

A preferred embodiment of the present invention will now be described in detail hereinafter with reference to the accompanying drawings.

Figure 1:
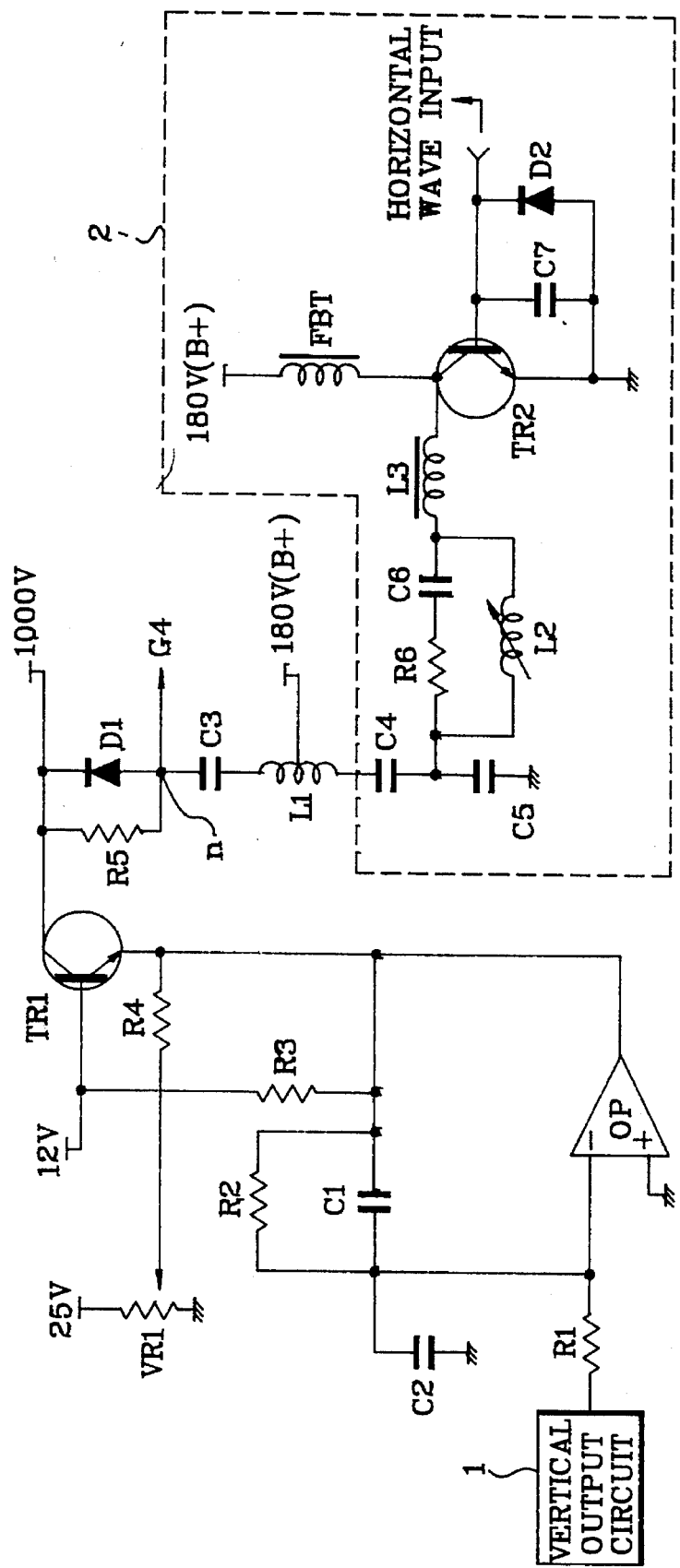
FIG. 1 is an electrical circuit diagram of the conventional dynamic focusing circuit.
Figure 2:
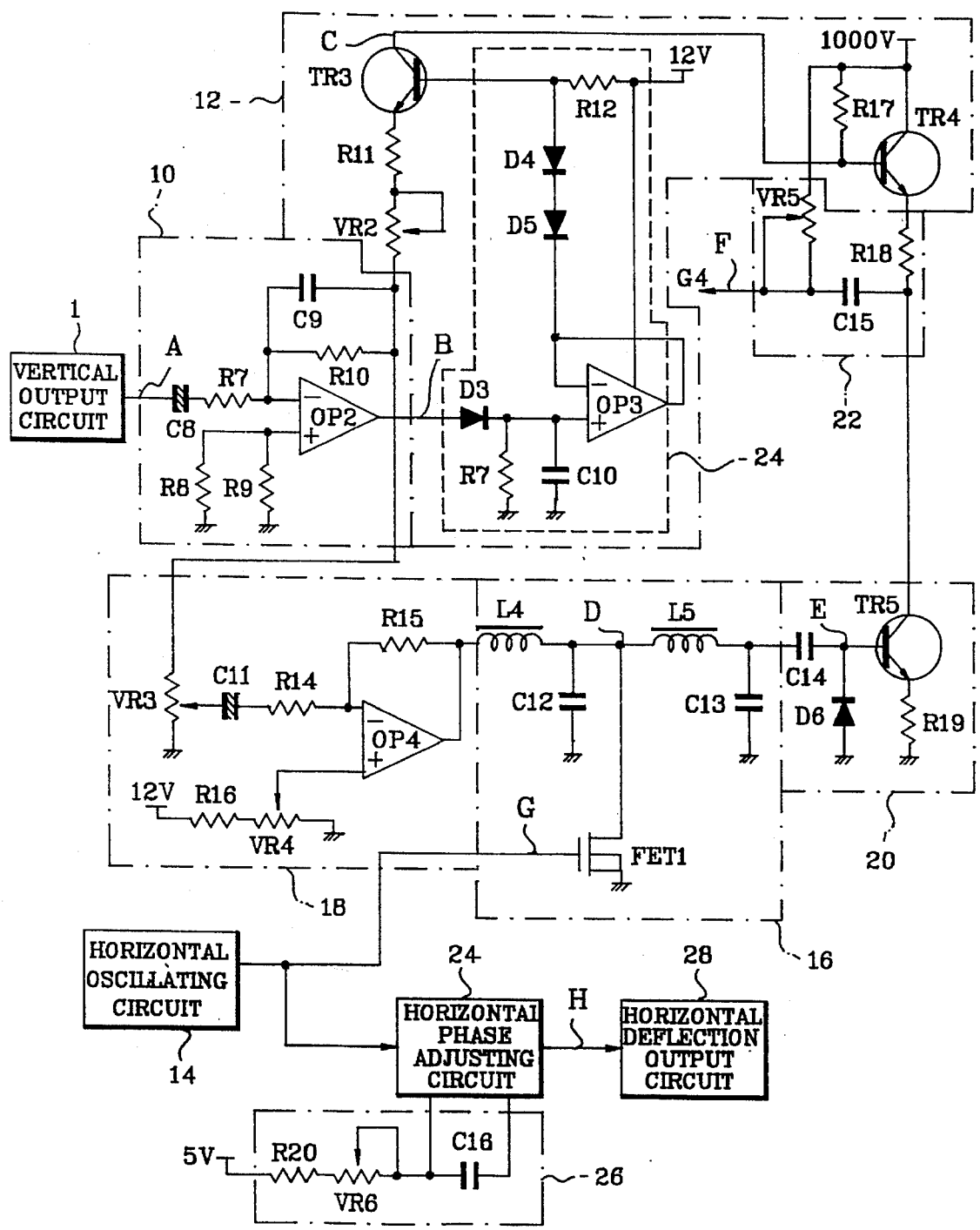
FIG. 2 is an electrical circuit diagram illustrating a dynamic focusing circuit according to an embodiment of the present invention.

Circuit elements shown in FIG. 2 are denoted with same numerals as the same elements of FIG. 1. Referring to FIG. 2, the amplifying circuit 12 is coupled to the vertical parabola wave output circuit 10 which produces a parabola wave signal by integrating a vertical sawtooth wave signal generated from the vertical output circuit The horizontal oscillating circuit 14 generating a rectangular wave signal of predetermined frequency is coupled to the pseudo horizontal output circuit 16 which generates a pseudo horizontal wave signal, and between the vertical parabola wave output circuit 10 and pseudo horizontal output circuit 16 the vertical modulating/horizontal size adjusting circuit(abbreviated VMHA circuit) 18 is coupled to vary the pseudo horizontal wave signal by way of modulating the vertical parabola wave signal.

In addition, the pseudo horizontal output circuit 16 is coupled to another amplifying circuit 20. Outputs of the amplifying circuits 12 and 20 are connected to the focus signal output circuit 22 which applies the dynamic focus signal including vertical and horizontal frequency components to the focus grid G4 of a CRT(not shown).

The horizontal oscillating circuit 14 is coupled to the horizontal phase adjusting circuit 24 which is connected to the duty adjusting circuit 26, and the output of the horizontal phase adjusting circuit 24 is connected to the input of the horizontal deflection output circuit 28.

The vertical parabola wave output circuit 10 consists of the capacitor C8 for cutting the DC component of the vertical sawtooth voltage, and the integrating circuit for integrating the vertical sawtooth wave signal. The integrator employs the operational amplifier OP2 in which the resistors R8 and R9 are connected in parallel between its non-inverting input terminal and ground, and the resistor R10 and the capacitor C9 are connected in parallel between its inverting input terminal and output terminal.

The amplifying circuit 12 has the bias stabilizing circuit 30. In the amplifying circuit 12, the power source voltage of 12 V is connected to the base of the amplifying transistor TR3 through the resistor R12. Between the emitter of the transistor TR3 and the output terminal of the operational amplifier OP2 the variable resistor VR2 is connected to control the amplification of the transistor TR3. Series connected diodes D4 and D5 are disposed between the node, between the base of the transistor TR3 and the resistor R12, and the inverting input terminal(coupled to the output terminal) of the operational amplifier OP3. The output signal of the operational amplifier OP2 is applied to the non-inverting input terminal of tile operational amplifier OP3 through the diode D3. The output terminal of the operational amplifier OP3 forms a feed-back loop with the inverting input terminal and the power source voltage of 12 V is applied to the control terminal of the operational amplifier OP3. The resistor R7 and the capacitor C10 are connected between the non-inverting input terminal of the operational amplifier OP3 and ground. The power source voltage of 1000 V is commonly applied to the collector of the transistor TR3 and the base of the buffering transistor TR4, through the resistor R17.

The output of the horizontal oscillating circuit 14 is supplied to the of the pseudo horizontal output transistor FET1 which has the identical function as that of the horizontal output transistor TR2 in FIG. 1. The drain of the transistor FET1 is coupled to one electrode of the pseudo flyback transformer L4, the pseudo deflection coil L5 and the pseudo resonance capacitor C12. The source of the transistor FET1 and the capacitor C12 are grounded. The other electrode of the coil L5 is coupled to one electrode of the ground capacitor C13 and to the base of the transistor TR5 through the capacitor C14.

In the VMHA circuit 18, the variable resistor VR3 connected between the output terminal of the operational amplifier OP2 and ground has a control electrode which is coupled to one electrode of the DC cut-off capacitor C11. The other electrode of the capacitor C11 is connected to an inverting input terminal of the operational amplifier OP4 through the resistor R14. The inverting input terminal of amplifier is connected to its output terminal through the resistor R15, the output terminal being coupled to the other electrode of the pseudo flyback transformer L4. Between the power source voltage of 12 V and ground the resistor R16 and variable resistor VR4 are connected in series. A non-inverting input terminal of the amplifier OP4 is coupled to a control electrode of the variable resistor VR4.

In the amplifying circuit 20, a base of the transistor TR5 is coupled to one electrode of the DC cut-off capacitor C14 in which the other electrode is connected to the other electrode of the pseudo deflection coil L5 (or one electrode of the capacitor C13), and also to a cathode of the damping diode D6 in which its anode is grounded. An emitter of the transistor TR5 is connected to ground through the resistor R19.

The duty adjusting circuit 26 consists of the resistor R29 connected to the power source voltage of 5 V, the variable resistor VR6 connected between the resistor R20 and the horizontal phase control circuit 24, and the time-constant adjusting capacitor C16 connected to the variable resistor VR6 and the horizontal phase control circuit 24. In the focus signal output circuit 22, one electrode of the variable resistor VR5 in which its control and the other electrodes are coupled to the grid G4 is connected to the collector of the transistor TR4. The resistor R18 is connected between the emitter of the transistor TR4 and the collector of the transistor TR5, and condenser C15 between the grid G4 and the resistor R18.

FIGS. 3A to 3H show the waveforms corresponding to the positions A to H indicated on FIG. 2, and FIGS. 3I and 3J respectively show the waveforms of the horizontal deflection flyback voltage and the horizontal component in the dynamic focus signal. The dynamic focusing operation according to the invention will be explained in detail with reference to FIGS. 3A through 3J.

Once the vertical sawtooth wave signal, as shown in FIG. 3A, generated from the vertical output circuit 1 is applied to the capacitor C10, the signal is integrated by the resistor R7 and the capacitor C9, resulting in the parabola wave signal at the output terminal of the operational amplifier OP2 as shown in FIG. 3B. The DC voltage level at this time is established by the voltage dividing resistors R8 and R9. The output signal of the amplifier OP2 as the parabola wave signal is amplified by the transistor TR3, The parameter of the amplification rate becoming the value of R17/(R174+VR2).

Namely, the amplitude of the vertical parabola wave signal can be controlled by the variable resistor VR2. An emitter bias voltage level of the transistor TR3 should be identical to a peak value of the output voltage of the operational amplifier OP2, for minimizing the power dissipation and load. It is accomplished by the bias stabilizing circuit TR4. The output signal at the collector of the transistor TR3 is applied to the base of the transistor TR4.

It should be noted that the horizontal wave signal generated from the pseudo horizontal output circuit 16 is satisfied to have very low voltage anti current low enough to generate a pseudo horizontal wave having the peak-to-peak value just about 5 V, according to the present invention, without resort to a high voltage of several hundred volt and a large current of several Amperes as in a conventional horizontal output circuit.

To solve the problem of incomplete focusing due to increasing phase deviation, with increase of horizontal frequency, between the deflection current wave and the horizontal wave, the horizontal rectangular wave signal generated from the horizontal oscillating circuit 14 is directly applied to the dynamic focusing circuit and the horizontal deflection output circuit 28 comprises the horizontal phase control circuit 24 which is coupled to the duty adjusting circuit 26.

That is, the phase of the horizontal deflection flyback voltage signal shown in FIG. 3I, can be shifted to the left or right direction and resultingly in accord with the phase of the horizontal wave component of the dynamic focus signal shown in FIG. 3J, by means of varying the duty of the wave shown in FIG. 3H according to the variable values of the capacitor C16, the variable resistor VR6 and the resistor R20. The peak-to-peak value of the waveform shown in FIG. 3I is about 1000 V. It is preferred for the correction of the phase deviation to adjust the peak position of the horizontal deflection flyback voltage signal so as to be in accord with that of the horizontal wave component of the dynamic focus signal.

The amplitude of the horizontal signal generated from the pseudo horizontal output circuit 16 can be controlled by the DC voltage level at the non-inverting input terminal of the operational amplifier OP4 which varies according to the variable resistance of the variable resistor VR4. The vertical parabola wave signal generated from the operational amplifier OP2 is applied to the inverting input terminal of the amplifier OP4 through the variable resistor VR3, the DC cut-off capacitor C11 and the resistor R14. Thus, the operative amplifier OP4 compares the input signal of the inverting input terminal with the feedback signal through the resistor R15 and the other input signal of the non-inverting input terminal, and then generates a modulated parabola wave signal.

The waveform of the signal at the drain of the transistor FET1, as shown in FIG. 3D, is obtained by varying the output signal of the operational amplifier OP4 with the capacitor C12 and the pseudo flyback transformer L4. And the deflection coil LS, S-correction capacitor C13 and the capacitor C14 convert the waveform of FIG. 3D into the waveform shown in FIG. 3E which is to be applied to the base of the transistor TR5.

At this time, the negative portion of the signal applied to the emitter of the transistor TR5 is cut off by the clamping diode D6 and the horizontal signal from the pseudo horizontal output circuit 16 appears at the collector of the transistor TR5 as an amplified signal. Though the amplified signal at the collector of the transistor TR5 has a horizontal frequency similar to that of the rectangular wave signal generated from the horizontal oscillating circuit 14, its whole signal form is able to have the vertical frequency.

Then, the amplified vertical signal at the emitter of the transistor TR4 and the amplified horizontal signal component at the collector of the transistor TR5 are mixed to form the dynamic focus signal. The DC component of the dynamic focus signal is eliminated by the capacitor C15 and an DC voltage level of the dynamic focus signal which is to be applied to the grid 64 is adjusted through the variable resistor VR5. The waveform of the signal applied to the grid G4 is the same as shown in FIG. 3F wherein the sign fv represents the vertical frequency, and the phase deviation between the deflection current wave and the horizontal wave component of the dynamic focus signal does not come out.

The horizontal signal generated from the horizontal oscillating circuit 14 is applied to a horizontal deflection coil(not shown) through the horizontal deflection output circuit 28, after its phase is adjusted by the horizontal phase control circuit 24. At the same time, the duty of the horizontal wave signal to be output is adjusted by the variable resistor VR6 which varies the time constant of the resistance and conductance. Thus, the horizontal wave signal which has been generated from the horizontal oscillating circuit 14 has its own phase and duty identical to those of the horizontal deflection current so that an exact focusing operation is accomplished.

The variable resistor VR2 controls the amplitude of the vertical wave signal, the variable resistor VR3 controls the amplitude of the components E1 and E2 in the wave shown in FIG. 3F, the variable resistor VR4 determines the amplitude of the horizontal wave signal and the variable resistor VR6 controls the phase deviation between the horizontal deflection current and the horizontal focus component.

As described above, the dynamic focusing circuit according to the present invention can eliminate the phase deviations between the horizontal deflection current and the horizontal frequency components by use of a pseudo horizontal output circuit which generates a horizontal signal component having low voltage and small current. In addition, a further advantage is that it is possible to enhance the correctness of the focus, despite the disturbance due to the characteristics of the CRT and deflection yoke, by use of a plurality of variable resistors which can control the amplitude of the vertical and horizontal components, the DC level of the focus signal, and the phase deviation between the horizontal deflection component and the horizontal component of the focus signal.

What is claimed is:

1. A dynamic focusing circuit generating a dynamic focus signal by use of a sawtooth wave signal generated from a vertical output circuit and a rectangular wave signal generated from a horizontal oscillating circuit, said dynamic focusing circuit comprising:

a vertical parabola wave output circuit for generating a vertical parabola wave signal after integrating and amplifying said sawtooth wave signal and eliminating a DC component from said sawtooth wave signal;

a first amplifying circuit for amplifying said vertical parabola wave signal;

a vertical-modulating and horizontal-size-adjusting circuit for modulating amplitude of said vertical parabola wave signal by comparing said vertical parabola wave signal with a predetermined variable reference voltage;

a pseudo horizontal output circuit for generating a pseudo horizontal wave signal whose amplitude is determined by a level of said variable reference voltage, wherein a wave signal formed by said rectangular wave signal is mixed with a wave signal supplied by said vertical-modulating and horizontal-size-adjusting circuit and thereby said rectangular wave signal is combined with said vertical parabola wave signal;

a second amplifying circuit for amplifying said pseudo horizontal wave signal;

a focus signal output circuit for varying DC voltage level of a dynamic focus signal consisting of a vertical frequency component generated from said first amplifying circuit and a horizontal frequency component generated from said second amplifying circuit;

a horizontal phase control circuit for controlling phase of said rectangular wave signal; and a duty adjusting circuit coupled to said horizontal phase control circuit for varying duty of said rectangular wave signal.

2. A dynamic focusing circuit according to claim 1, wherein said first amplifying circuit comprises:

a first means for varying amplitude of said vertical parabola wave signal which is integrated;

a first transistor for amplifying said vertical parabola wave signal to be applied to said first means;

a bias stabilizing circuit for applying a bias stabilizing signal to a base of said first transistor so that an emitter bias level is identical to the voltage level of said vertical parabola wave signal; and a second transistor for buffering an output voltage at a collector of said first transistor.

3. A dynamic focusing circuit according to claim 1, wherein said vertical-modulating and horizontal-size-adjusting circuit comprises:

a first means for adjusting amplitude of said vertical frequency component of said dynamic focus signal by varying the DC voltage level of said vertical parabola wave signal;

a first capacitor for cutting off the DC component of said vertical parabola wave signal supplied from said first means;

a second means for determining amplitude of said horizontal frequency component of said dynamic focus signal according to a predetermined reference voltage which is established by a resistance; and an operational amplifier for comparing a signal passed through said first condenser with said reference voltage of said second means.

4. A dynamic focusing circuit according to claim 1, wherein said pseudo horizontal output circuit comprises:

a pseudo horizontal output transistor for generating said pseudo horizontal wave signal according to said rectangular wave signal;

a pseudo flyback transformer for receiving said output signal of said vertical-modulating and horizontal-size-adjusting circuit; and a pseudo deflection coil and resonance capacitor for generating a horizontal wave signal including said vertical frequency component according to receipt of output signals of said pseudo horizontal output transistor and pseudo flyback transformer.

5. A dynamic focusing circuit according to claim 1, wherein said second amplifying circuit comprises:

a first capacitor for eliminating the DC proportion from said pseudo horizontal wave signal;

a damping diode for damping negative voltage portions of a signal to be supplied to said first condenser; and a first transistor for amplifying a signal applied to said damping diode.

6. A dynamic focusing circuit according to claim 1, said focus signal output circuit comprises:

a first capacitor for eliminating the DC component from said dynamic focus signal including signals generated from said first and second amplifying circuit; and a first means for varying the DC voltage level of said dynamic focus signal applied to said first condenser.

7. A dynamic focusing circuit according to claim 1, said duty adjusting circuit comprises:

a first capacitor coupled to said horizontal phase control circuit in parallel; and a first means connected to said first condenser for adjusting duty of a signal generated from said horizontal phase control circuit by varying a time constant.

* * * * *